United States Patent
Hüttenhofer

(10) Patent No.: US 11,826,912 B2
(45) Date of Patent: Nov. 28, 2023

(54) METHOD AND CONTROL MEANS FOR CONTROLLING A ROBOT ASSEMBLY

(71) Applicant: KUKA Deutschland GmbH, Augsburg (DE)

(72) Inventor: Manfred Hüttenhofer, Meitingen (DE)

(73) Assignee: KUKA Deutschland GmbH, Augsburg (DE)

( * ) Notice: Subject to any disclaimer, the term of this patent is extended or adjusted under 35 U.S.C. 154(b) by 208 days.

(21) Appl. No.: 16/761,059

(22) PCT Filed: Oct. 26, 2018

(86) PCT No.: PCT/EP2018/079380
§ 371 (c)(1),
(2) Date: May 1, 2020

(87) PCT Pub. No.: WO2019/086339
PCT Pub. Date: May 9, 2019

(65) Prior Publication Data
US 2021/0178582 A1  Jun. 17, 2021

(30) Foreign Application Priority Data

Nov. 3, 2017 (DE) ...................... 10 2017 010 244.9

(51) Int. Cl.
*B25J 9/16* (2006.01)
*B25J 9/02* (2006.01)

(52) U.S. Cl.
CPC ............. *B25J 9/1664* (2013.01); *B25J 9/023* (2013.01); *B25J 9/1643* (2013.01); *B25J 9/1687* (2013.01)

(58) Field of Classification Search
CPC ........ B25J 9/1664; B25J 9/023; B25J 9/1643; B25J 9/1687; B25J 9/1669; B25J 9/1607;
(Continued)

(56) References Cited

U.S. PATENT DOCUMENTS

2011/0106308 A1* 5/2011 Eliasson ................ B25J 9/1664
700/250
2011/0153297 A1* 6/2011 Keibel ................. A61N 5/1043
703/7
(Continued)

FOREIGN PATENT DOCUMENTS

DE 102004044457 A1 3/2006
DE 102014103370 A1 9/2015
(Continued)

OTHER PUBLICATIONS

Pashkevich A P et al, "Computer-aided programming of robotic manufacturing cells for laser cutting applications", Emerging Technologies and Factory Automation, 2001. Proceedings. 2001 8th IEEE International Conference on Oct. 15-18, 2001, Piscataway, NJ, USA, IEEE, (Oct. 15, 2001), ISBN 978-0-7803-7241-2, pp. 603-612, XP010589021 [A] 1-10; the whole document.
(Continued)

*Primary Examiner* — Abby Y Lin
*Assistant Examiner* — Dylan Brandon Mooney
(74) *Attorney, Agent, or Firm* — Dorton & Willis, LLP

(57) ABSTRACT

A method for controlling a robot assembly having at least one robotic arm. The method includes determining a trajectory in the axis space of the robot assembly on the basis of a path having a plurality of previously specified Cartesian poses of at least one robot-assembly-fixed reference, and determining control values in the axis space on the basis of said trajectory. The robot assembly is controlled on the basis of the control values.

13 Claims, 2 Drawing Sheets

(58) Field of Classification Search
CPC ......... B25J 9/1653; G05B 2219/39358; G05B 2219/40336; G05B 2219/40463; G05B 2219/39134; G05B 2219/40384; G05B 2219/40387; G05B 2219/39079
See application file for complete search history.

(56) References Cited

U.S. PATENT DOCUMENTS

| | | | |
|---|---|---|---|
| 2011/0224815 A1* | 9/2011 | Sonner | B25J 9/1664 700/97 |
| 2014/0074289 A1* | 3/2014 | Xiao | B25J 9/1643 901/3 |
| 2015/0073593 A1 | 3/2015 | Hamm et al. | |
| 2017/0197310 A1 | 7/2017 | Aurnhammer et al. | |
| 2017/0371314 A1* | 12/2017 | Krause | G05B 19/0426 |

FOREIGN PATENT DOCUMENTS

| | | | | |
|---|---|---|---|---|
| DE | 102008058298 B4 | 1/2016 | | |
| DE | 102014213262 A1 | 1/2016 | | |
| DE | 102011082800 B4 | 4/2016 | | |
| DE | 102015004146 B3 | 6/2016 | | |
| WO | 2010057528 A1 | 5/2010 | | |
| WO | WO-2012143044 A1 * | 10/2012 | ............ | B25J 9/1643 |

OTHER PUBLICATIONS

European Patent Office; Search Report in related International Patent Application No. PCT/EP2018/079380 dated Mar. 15, 2019; 3 pages.
German Patent Office; Office Action in related German Patent Application No. 10 2017 010 244.9 dated May 24, 2018; 5 pages.
Chinese Patent Office; Office Action in related Chinese Patent Application No. 201880071407X dated Nov. 21, 2022; 9 pages.

* cited by examiner

METHOD AND CONTROL MEANS FOR CONTROLLING A ROBOT ASSEMBLY

CROSS-REFERENCE TO RELATED APPLICATIONS

This application is a national phase application under 35 U.S.C. § 371 of International Patent Application No. PCT/EP2018/079380, filed Oct. 26, 2018 (pending), which claims the benefit of priority to German Patent Application No. DE 10 2017 010 244.9, filed Nov. 3, 2017, the disclosures of which are incorporated by reference herein in their entirety.

TECHNICAL FIELD

The present invention relates to a method and a control means for controlling a robot assembly comprising at least one robot arm, and to a computer program product for carrying out the method, and to a robot assembly comprising the control means.

BACKGROUND

For controlling robots it is known, from company practice, to first specify a plurality of cartesian poses of a reference fixed to the robot, for example the tool center point (TCP), for example by means of manually entering the poses with the reference ("teaching") and storing said poses.

Then, in order to travel a path in automatic operation, each time a cartesian path having these poses is first planned, on the basis of an operational program. Then, during travel, this path is scanned in each case in an interpolation cycle of the controller, and the discrete cartesian path points obtained in the process are transformed onto corresponding axial coordinates which are then used for actuating the robot drives.

In this case, in particular as a result of this variable scanning of the cartesian path in the relevant, in particular velocity-dependent, interpolation cycle, very different axial coordinates may result, and therefore the robot travels the same poses in a differing and unpredictable manner.

This is clear in particular in the case of redundant robots, in which the axial coordinates in the interpolation cycle are determined by resolving the redundancy. This redundancy resolution depends to a great extent on the discretization.

SUMMARY

The object of the present invention is that of improving the control of a robot assembly.

This object is achieved by a method as described herein, a control means or a computer program product for carrying out a method described herein, or a robot assembly comprising control means described herein.

According to one embodiment of the present invention, a robot assembly comprises one or more robot arms which, or one or more of which, comprises or comprise, in one embodiment, one or more, in particular at least three, in each case, in one embodiment at least six, in one development at least seven, axes or joints, in particular axes of rotation or swivel joints, which, in one embodiment, can be or are moved or adjusted by means of an, in particular electromotive, drive in each case.

According to one embodiment of the present invention, a method for controlling the robot assembly comprises the steps of:

determining, in particular calculating and/or storing, a trajectory in the axis space of the robot assembly, on the basis of a path having a plurality of cartesian poses, specified in advance, of one or more reference(s) fixed to the robot assembly;

determining control values in the axis space, on the basis of said trajectory, in particular during the transit time or when travelling the path, and/or in an interpolation cycle of a controller; and controlling the robot assembly on the basis of said control values, said determination of the trajectory or control values also being referred to, in the present case and without restricting the generality, as primary determination, in order to distinguish it from a following determination which is accordingly also referred to as renewed determination, without primary being intended to indicate a higher level or the like.

In one embodiment, the one or more reference(s) fixed to the robot assembly can (in each case) comprise, in particular be, a TCP (tool center point) of the (corresponding) robot arm. As a result, in one embodiment operational processes of the robot assembly can be controlled in an advantageous manner.

In one embodiment, a cartesian pose of a reference fixed to the robot has a one-, two- or three-dimensional cartesian position and/or orientation of the reference, and can in particular define this and/or be defined thereby.

In one embodiment, the cartesian poses are specified in advance by approaching, in particular manually, with the robot assembly, and by storing parameters (known as "teaching"). In addition or alternatively, cartesian poses can also be specified in a model-assisted manner, in particular using a simulation, on the basis of CAD data or the like (known as offline programming).

The path may comprise one or more of the specified cartesian poses. In addition or alternatively, in one embodiment the path may be spaced apart from one or more of the specified cartesian poses, in particular overshoot particular poses, or the like.

In one embodiment the axis space of the robot assembly comprises one or more, and in one embodiment it comprises all, of the (possible) axial or joint coordinate values, in particular axial or joint positions, in particular angles, of the robot assembly, in particular of the or of one or more, in particular all, of the robot arms which, in the present case, are designated in the conventional manner by q, and can in particular be defined or spanned thereby.

A trajectory in axis space can comprise, in particular interpolate, a plurality of points of the axis space or corresponding poses of the robot assembly. In one embodiment this is determined or interpolated in parameterized form, preferably on the basis of one or more polynomials, spline functions or the like: $q=q(s)$ having the path parameter s. In one embodiment, a function $ds/ds(x)=q(s)$ defines a velocity profile of the trajectory (along the robot assembly).

It is thus possible, in one embodiment, for the scanning of the trajectory to be improved.

In one embodiment, the plurality of cartesian poses of the path, specified in advance, on the basis of which the trajectory in the axis space of the robot assembly is determined, comprises three or more, in particular, excluding a start and end point, one or more further intermediate points specified in advance.

It is thus possible, in one embodiment, to advantageously optimize a complete path as a whole. Accordingly, in one embodiment, the plurality of cartesian poses of the path is already specified prior to (the start of) traveling the path using the robot assembly, and in a development this is stored, in particular in a non-volatile manner, and in one embodiment is accordingly retrieved from an in particular non-volatile memory in order to determine the trajectory.

Since the control values are determined on the basis of the trajectory in axis space, and no longer, as was the case according to the in-house practice explained at the outset, only at the transit time, on the basis of the cartesian path, a variation which results for example in the case of resolution of redundancy or iterative determination of discrete inverse transformations, and thus leads to different trajectories in the axis space, on the basis of the same specified cartesian poses, can advantageously be reduced. In addition or alternatively, the computing load during transit time or when traveling the path can be reduced thereby.

In one embodiment, the method comprises the steps of:
renewed determination of the same trajectory in the same manner as during primary determination, in particular by means of the same scanning of the path and/or the same starting pose of the robot assembly;
renewed determination of control values in the axis space on the basis of said newly determined trajectory; and
controlling the robot assembly on the basis of said newly determined control values, said steps being repeated, in one embodiment, one or more times.

Thus, in one embodiment, prior to each time the path is traveled, first of all the same trajectory is determined in the same manner, and this trajectory is then used for controlling the robot assembly.

As a result it is possible, in one embodiment, for a deviation, in particular in the axis space, when travelling the same specified cartesian pose, and at the same time a memory space requirement, to be reduced.

In this case, in one embodiment, the control values are newly determined, starting from a contact point of the trajectory that is spaced apart from the start of the trajectory and has previously not been approached on the trajectory. In other words, the same trajectory is entirely newly determined, in the same manner as in the primary determination, but then only a portion starting with a contact point is used or traveled in order to control the robot assembly, said contact point not being previously approached in another manner, i.e. on the trajectory. In this way, it is possible to achieve the same trajectory again, in the axis space, starting from the contact point, but without having to pass through said trajectory completely.

In one embodiment, the primary and/or renewed determination of control values (in each case) comprises: variable scanning of the primarily or newly determined trajectory.

In one embodiment, scanning comprises determining discrete values, in particular by evaluating a function having corresponding discrete parameter or variable values.

As a result, the same trajectory can be scanned or traveled in a manner adjusted to the situation. In particular, in one embodiment, said trajectory can be scanned in a more fine manner at slow velocities and in a coarser manner at higher velocities. In one embodiment, the trajectory for determining control values is scanned in a (current) interpolation cycle of a drive controller of the robot assembly, in the present case, for more compact illustration, regulation also being referred to, in a generalized manner, as control.

In addition or alternatively, the primary and/or renewed determination of control values (in each case) comprises: correcting one or more points of the primarily or newly determined trajectory to a control value, if a deviation of a cartesian pose, which corresponds to said (relevant) point of the trajectory, from a corresponding point of the path, in one embodiment corrected in a sensor-assisted manner relative to the path having the poses specified in advance, exceeds a specified tolerance value, in particular while resolving a redundancy of the robot assembly with respect to the path and/or in order to reduce the deviation. In one embodiment, the trajectory is determined such that at least at specified discrete trajectory points, in particular interpolation or support points, a deviation of a cartesian pose, which corresponds to the relevant point of the trajectory, from a corresponding point of the path having the poses specified in advance, does not exceed a specified tolerance value.

Nonetheless, undesirably large deviations may occur when determining control values. This may be due to the fact that, during the current determination of control values, the trajectory is scanned in a different, in particular finer, manner, and the deviation is excessively large at these (different, in particular additional) scanning points. This can be counteracted by corresponding correction of the trajectory points to the control values.

In addition, the currently desired or target path may also deviate from the poses specified in advance, in particular if, in one embodiment, it is changed in a sensor-assisted manner. It is thus possible, for example, for taught target poses to be changed on the basis of sensor-detected deviations of a workpiece to be machined, or the like. Then the trajectory maps the target poses that are specified in advance or taught, but not the target poses changed in a sensor-assisted manner or the path corrected in a sensor-assisted manner, with said poses changed in a sensor-assisted manner. This, too, can be counteracted by corresponding correction of the trajectory points to the control values.

In one embodiment, the primary and/or renewed determination of the trajectory comprises: planning, in particular optimizing, the path on the basis of the poses and/or of an operational program for the robot assembly. This optimization can in particular comprise, in particular be, an optimization of the shape of the path, in particular in order to prevent collisions or the like.

By means of planning, in particular optimizing, the (complete) path on the basis of poses specified in advance prior to the (beginning of the) determination of the trajectory, in one embodiment the poses can be traveled on a particularly advantageously globally optimized path. By planning, in particular optimizing, the (complete) path on the basis of an operational program for the robot assembly that is in particular specified in advance and, in one embodiment, is stored in particular in a non-volatile manner, in one embodiment the desired path can be specified easily, reliably, and/or in a manner requiring little memory space. It is thus possible, for example, for linear travel of a pose $x_i$, which is optionally also more distant, in the cartesian space, to be specified easily, reliably, and/or in a manner requiring little memory space, by the command "LIN($x_i$)." In general, in one embodiment, the path is specified in advance on the basis of an operational program for the robot assembly.

In addition or alternatively, in one embodiment the primary or renewed determination of the trajectory comprises: determining, in particular iteratively and/or incrementally determining, discrete trajectory points, in particular inverse transformations, on the basis of discrete path points, in particular together with recursive minimization of a deviation of a cartesian pose, which corresponds to the relevant trajectory point, from a corresponding point of the path.

In the case of non-redundant robot assemblies, with the exception of unique poses, an inverse transformation or inverse Jacobian matrix $J^1$ exists which maps a cartesian pose (change) onto a finite number of corresponding axial coordinate (changes): $\Delta q_i = J^{-1} \Delta x_i$. However, while the forwards transformation $VT: x_i = VT(q_j)$ can generally be calculated analytically, this is not always the case for the inverse transformation. Accordingly, in one embodiment, this is determined in an iterative manner, in particular by iteratively solving the equation system $\Delta q = -J^{-1} \Delta x$.

Iterative or incremental determination of discrete trajectory points advantageously makes it possible to use linearization, in particular also in the case of redundancy resolution. In one embodiment, incremental determination of said trajectory points comprises determination of discrete trajectory points on the basis of preceding trajectory points and (determined) increments.

In addition or alternatively, in one embodiment the primary or renewed determination of the trajectory comprises: optimizing a velocity profile of the trajectory (along the robot assembly) on the basis of a dynamic model of the robot assembly. Thus, in one embodiment, first of all the shape of the trajectory is determined, on the basis of the path, and subsequently a velocity profile along said trajectory is optimized, on the basis of a dynamic model of the robot assembly.

In addition or alternatively, in one embodiment the primary or renewed determination of the trajectory comprises: interpolating discrete trajectory points. As already explained, in one embodiment, on the basis of one or more polynomials, spline functions or the like, the interpolation of discrete trajectory points, in particular by means of a parameterized function, can advantageously improve the scanning of the trajectory.

In addition or alternatively, in one embodiment the primary or renewed determination of the trajectory comprises: resolving a redundancy of the robot assembly with respect to the path. In a development, the redundancy is resolved taking account of a quality factor that is specified in cartesian and/or in axis space, in particular a distance from axis regions to be avoided and/or desired cartesian poses, in particular by means of a null space projection.

In one embodiment, resolving the redundancy when determining the trajectory makes it possible to advantageously always determine at least substantially the same trajectory, and in addition to reduce a computation time requirement in the transit time or when traveling the path.

In one embodiment, redundancy of the robot assembly with respect to the path comprises, in a manner that is per se conventional in the art, an excess number of dimensions of axial coordinates of the robot assembly relative to the specified poses. In particular in the case of six-dimensional specified poses, this can result from the robot assembly comprising two or more, in particular cooperating, robot arms, having a total of at least seven axes and/or at least one robot arm having at least seven axes, which correspondingly constitutes advantageous applications of the present invention. Similarly, redundancy of the robot assembly with respect to the path can for example also result in the case of six-axis robot arms and specified cartesian poses, in which a position and/or orientation is not specified, in one or more directions.

According to one embodiment of the present invention, a control means for controlling the robot assembly is designed, in particular in terms of hardware and/or software, in particular in terms of programming technology, to carry out a method described herein, and/or comprises:

means for primary determination, in particular calculation and/or storage, of a trajectory in the axis space of the robot assembly, on the basis of a path having a plurality of cartesian poses, specified in advance, of one or more reference(s) fixed to the robot assembly;

means for primary determination of control values in the axis space, on the basis of said trajectory, in particular during the transit time or when travelling the path, and/or in an interpolation cycle of a controller; and means for controlling the robot assembly on the basis of said control values.

In one embodiment, the control means or the means thereof comprises:

means for renewed determination of the same trajectory in the same manner;

means for renewed determination of control values in the axis space, on the basis of said newly determined trajectory, in particular starting from a contact point of the trajectory that is spaced apart from the start of the trajectory and has previously not been approached on the trajectory; and means for controlling the robot assembly on the basis of said newly determined control values.

In one embodiment, the control means or the means thereof for primary and/or renewed determination of control values comprises:

means for variable scanning of the primarily or newly determined trajectory; and/or means for correcting at least one point of the primarily or newly determined trajectory to a control value, if a deviation of a cartesian pose, which corresponds to said point of the trajectory, from a corresponding point of the path, which has in particular been corrected in a sensor-assisted manner, exceeds a specified tolerance value, in particular while resolving a redundancy of the robot assembly with respect to the path and/or in order to reduce the deviation.

In one embodiment, the control means or the means thereof for primary and/or renewed determination of the trajectory comprises:

means for planning, in particular optimizing, the path on the basis of the poses and/or of an operational program for the robot assembly;

means for determining discrete trajectory points, in particular inverse transformations, on the basis of discrete path points, in particular together with recursive minimization of a deviation of a cartesian pose, which corresponds to the relevant trajectory point, from a corresponding point of the path;

means for interpolating discrete trajectory points;

means for optimizing a velocity profile of the trajectory on the basis of a dynamic model of the robot assembly; and/or means for resolving the redundancy of the robot assembly with respect to the path, taking account of a quality factor that is specified in cartesian and/or in axis space, in particular a distance from axis regions to be avoided and/or desired cartesian poses, in particular by means of a null space projection.

A means within the meaning of the present invention can be designed so as to be hardware-based and/or software-based, and can in particular comprise an in particular digital processing unit, in particular microprocessor unit (CPU), which is preferably in data or signal connection with a memory and/or bus system, and/or one or more programs or program modules. The CPU can be designed to process commands that are implemented as a program stored in a memory system, to detect input signals from a data bus, and/or to emit output signals to a data bus. A memory system may comprise one or more, in particular different, storage media, in particular optical, magnetic, solid state, and/or other nonvolatile media. The program can be configured such that it embodies or is capable of executing the methods described herein, such that the CPU can carry out the steps of such methods and can thus in particular control the robot assembly. In one embodiment, a computer program product can comprise, in particular be, an, in particular nonvolatile, storage medium for storing a program or having a program stored thereon, execution of said program triggering a control means or a controller, in particular a computer, to execute a method described herein or one or more of the steps thereof.

In one embodiment, one or more, in particular all, of the steps of the method are performed in a completely or partially automated manner, in particular by the control means or the means thereof.

The present invention can be used particularly advantageously in redundant robots. Similarly, it can also be used in particular when determining the inverse transformation of the cartesian in the axis space, in the case of a forwards transformation function that cannot be analytically inverted, in particular in planning (in particular with constant discretization) or in interpolation (in particular with variable discretization).

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
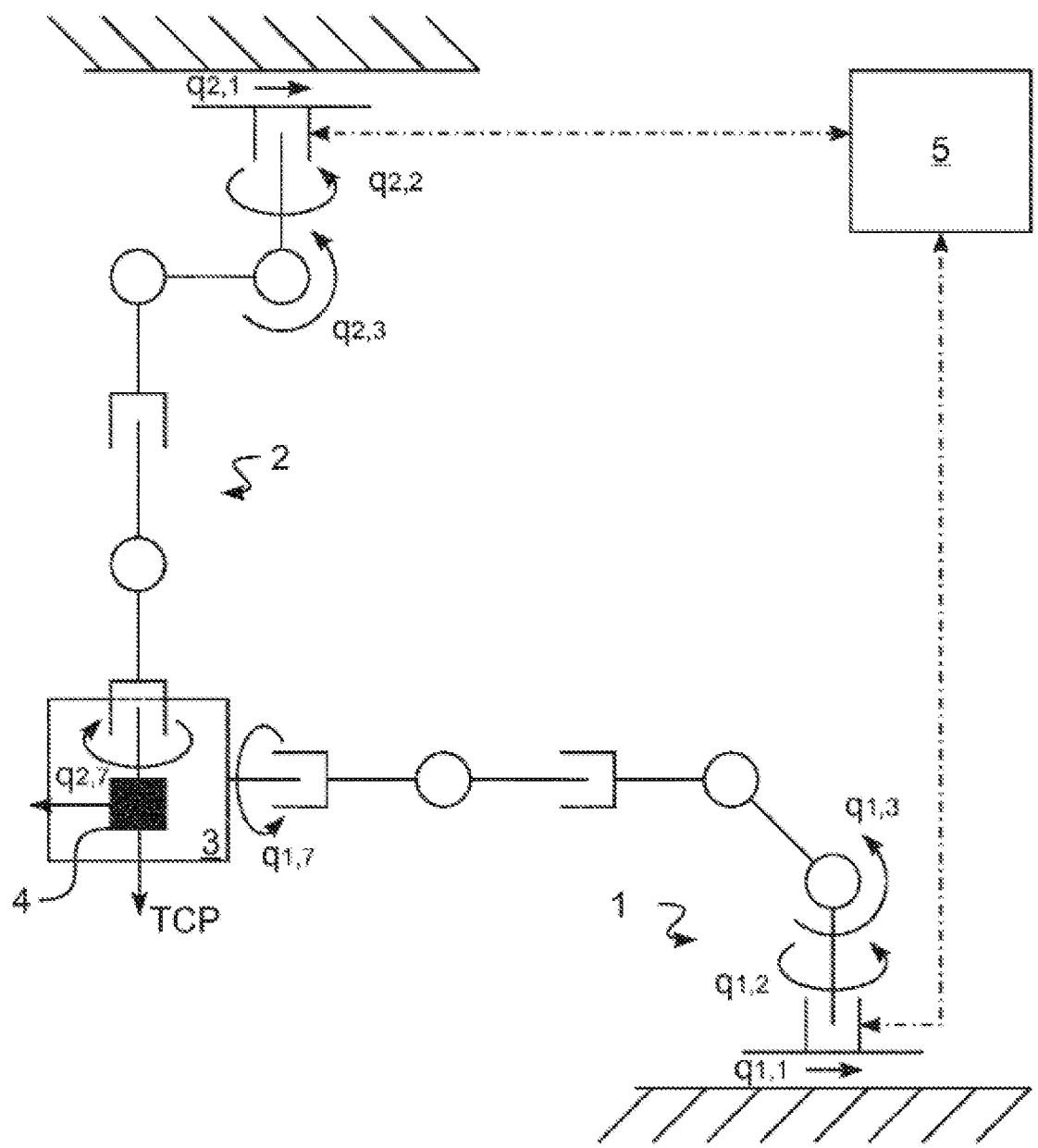
FIG. 1 shows a robot assembly comprising two robot arms and a control means for controlling the robot assembly according to an embodiment of the present invention.
Figure 2:
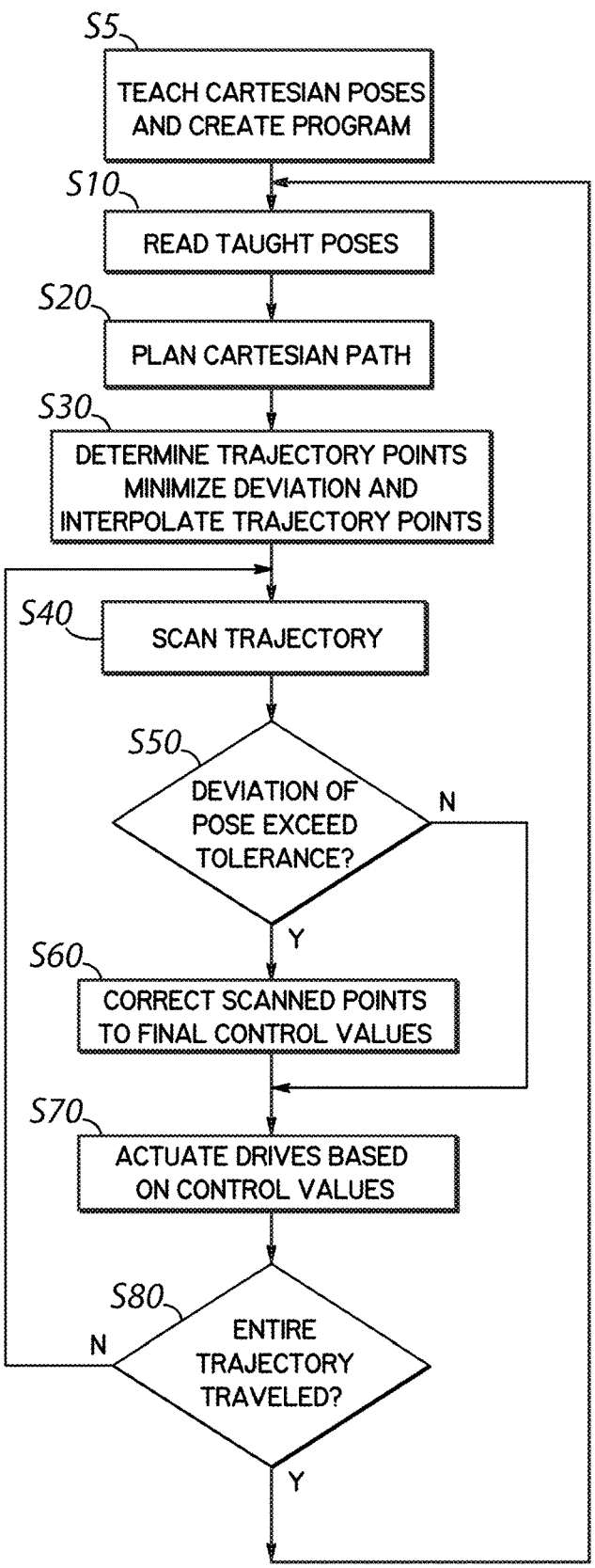
FIG. 2 shows a method for controlling the robot assembly according to an embodiment of the present invention.

FIG. 1 shows, by way of example, a robot assembly comprising two robot arms 1, 2 having seven axes in each case, and a control means in the form of a robot controller 5 for controlling the robot assembly according to an embodiment of the present invention which carries out a method described in the following with reference to FIG. 2.

Purely by way of example, both robot arms 1, 2 each comprise a linear axis having an axial coordinate $q_{1,1}$ or $q_{2,1}$, and six axes of rotation of which, by way of example, the axial coordinates or joint angles $q_{1,2}$, $q_{1,3}$, $q_{1,7}$, $q_{2,2}$, $q_{2,3}$ and $q_{2,7}$ are labelled. In this case, again purely by way of example, the master robot 1 guides a workpiece 3 which the slave robot 2 is intended to machine using a tool 4.

The vector of the axial coordinate is designated $q=[q_{1,1}, \ldots, q_{2,2}]^T$, in a manner conventional in the art, the dimension thereof in the embodiment being purely by way of example.

In a step S5, carried out in advance, first of all cartesian poses $x_i$ of the TCP of the slave robot 2 relative to the master robot-guided workpiece 3 are taught, and an operational program for the robot assembly is created on the basis of said poses, for example with program commands "travel from pose $x_i$ in cartesian space, on a straight line, to pose $x_{i+1}$" or the like. This, again, is also purely by way of example, and in the same way, in modifications, for example three-dimensional positions and orientations of a TCP of a seven-axis or multiple-axis robot arm, or merely the three-dimensional position of a TCP of a six-axis robot arm could be taught.

The forwards transformation VT or Jacobian matrix J can be determined analytically and transfers, in a linear approximation, axial coordinate increments $\Delta q$ into pose increments $\Delta x$:

$$\Delta x = J \cdot \Delta q.$$

Owing to the redundancy, this Jacobian matrix J cannot be clearly inverted. However, a right inverse $J^{\#}$ exists, having:

$$J \cdot J^{\#} = 1; J^{\#} \cdot J \neq 1,$$

which defines a null-space transformation $(1-J^{\#} \cdot J)$.

Using these, it is possible for axial coordinates to be determined in an incremental manner, such that they primarily approximate a cartesian path x(s) as well as possibly and in addition, subordinately or in a manner having lower priority, achieve desired axial coordinate changes $\Delta q_{opt}$:

$$\Delta q = J^{\#} \cdot \Delta x + (1-J^{\#} \cdot J) \cdot \Delta q_{opt}.$$

In the case of this redundancy resolution, the desired axial coordinate changes can take account of or map a quality factor specified in the axis space, for example maximize a distance of the axial coordinates from axial regions to be avoided:

$$\Delta q_{opt} = \lambda \cdot \nabla w(q)$$

having a scalar weighting $\lambda$ of a function w(q), which rises (significantly), close to the axis regions to be avoided, and the known nabla operator $\nabla$.

Similarly, in the case of the redundancy resolution, the desired axial coordinate changes can take account of or map a quality factor specified in cartesian space, for example desired cartesian poses $x_{opt}$ of the workpiece 3, in an incremental form:

$$\Delta x_{opt} = J_{opt} \cdot \Delta q.$$

Inserted into the above equation, $\Delta q = J^{\#} \cdot \Delta x + (1-J^{\#} \cdot J) \cdot \Delta q_{opt}$ this leads to $$\Delta q = J^{\#} \cdot \Delta x + (1-J^{\#} \cdot J) \cdot \lambda \nabla w(q)$$

or $$\Delta q = J^{\#} \cdot \Delta x + [J_{opt} \cdot (J_{opt} \cdot (1-J^{\#} \cdot J))]^{\#} \cdot (\Delta x_{opt} - J_{opt} \cdot J^{\#} \cdot \Delta x)$$

having the right inverses as defined above $[J_{opt} \cdot (1-J^{\#} \cdot J)]^{\#}$.

Prior to each approach of the taught poses $x_i$, in accordance with the operational program, in a step S10 the controller 5 reads in the taught poses $x_i$ and, in a step S20, plans the cartesian path on the basis of said poses and of the operational program x(s).

Then, in a step S30, always in the same manner, the controller 5 determines incremental points $q_j$ of a trajectory q(s):

$$q_{j+1} = q_j + \Delta q_j,$$

the increments $\Delta q_j$ being determined for example according to any of the above equations for $\Delta q$, and the cartesian path x(s) always being scanned in the same manner, beginning with the same starting pose of the robot assembly.

In this case, in step S30, a deviation $\Delta x_{Rest}$ of a cartesian pose $x_j = VT(q_j)$, (VT being the forwards transformation function), which corresponds to the relevant trajectory point $q_j$, from a corresponding point $x(s_j)$ of the path, is recursively minimized, in that the method described above for $\Delta x = J \cdot \Delta q$ is applied to $$\Delta x_{Rest} = J \cdot \Delta q_{Rest}$$

until the deviation $\Delta x_{Rest}$ falls below a specified residual error limit.

Subsequently, in step S30, the incrementally determined trajectory point $q_j$ is interpolated by spline functions which are stored. In addition or alternatively, in step S30 optimization of the velocity profile $\dot{s}(s)$ along the trajectory can take place.

In a step S40, this trajectory q(s) is then scanned during the transit time in the interpolation cycle of the controller, and thus in a variable manner, or the corresponding spline functions are evaluated, and thus preliminary control values for the drives of the robot arms 1, 2 are determined.

In a step S50, the deviation of the cartesian pose, which corresponds to the trajectory points scanned in each case or the preliminary control value, from a corresponding point of the planned path is determined, and, in a step S60, the scanned trajectory points or preliminary control values are corrected to final control values, as has already been described above for scanning the path or determining the trajectory, if the deviation exceeds a specified tolerance value (S50: "Y"). In this case, just as in step S30, the planned path can additionally be corrected in a sensor-assisted manner, for example be displaced or the like, due to deviations of the workpiece 3 that are recorded in a sensor-assisted manner.

In a step S70, the drives of the robot arms 1, 2 are controlled/actuated on the basis of said control values, until the entire trajectory has been traveled (S80: "Y").

For new travel of the path or trajectory, the steps S10 to S80, explained above, are repeated. In this case, if necessary, step S40 can also start from a contact point that is spaced apart from the start of the trajectory and has previously not been approached on the trajectory.

In general, as explained on the basis of the above example, in one embodiment of the present invention, in automatic operating mode for multiple times traveling the same cartesian poses, specified in advance, the cartesian path is planned (S20) prior to travel in each case, and a trajectory in axis space is determined (S30) therefor, using redundancy resolution and optionally recursive minimization of a deviation, which is subsequently scanned (S40) during the transit time, the scanned trajectory points optionally being corrected (S60) and the robot arms 1, 2 being controlled (S80) on the basis of these, optionally corrected, trajectory points or control values. In this case, the reference fixed to the robot assembly is the TCP of the slave robot 2, the cartesian poses of which, relative to the workpiece 3, are specified in advance (S5). This is, as already mentioned, given merely by way of example, and in the same way, for example it is also possible to teach absolute cartesian poses of a TCP of a robot arm, relative to the surroundings or the robot arm base.

Although embodiments given by way of example have been explained in the preceding description, it is noted that a plurality of modifications are possible. It should furthermore be noted that the embodiments given by way of example are merely examples which are not intended to restrict the scope of protection, the applications, and the structure, in any way. Instead, the above description provides guidance for a person skilled in the art to implement at least one embodiment given by way of example, it being possible for various amendments to be made, in particular in view of the function and arrangement of the described components, without departing from the scope of protection as emerges from the claims and the combinations of features equivalent thereto.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for controlling a robot assembly comprising at least one robot arm, the method comprising:
   determining a path of at least one reference fixed to the robot assembly from a plurality of Cartesian poses that are specified in advance;
   prior to each traveling of the complete path, determining a first trajectory that accounts for position and orientation in an axis space of the robot assembly based on the path;
   determining first control values in the axis space based on the determined first trajectory; and
   controlling operation of the robot assembly based on the determined first control values.

2. The method of claim 1, further comprising:
   determining a second trajectory in the axis space of the robot assembly based on the path of the at least one reference;
   determining second control values based on the determined second trajectory; and
   controlling operation of the robot assembly based on the determined second control values.

3. The method of claim 2, wherein the second control values are determined starting from a contact point of the second trajectory that is spaced apart from the start of the second trajectory and which was not previously approached on the first trajectory.

4. The method of claim 1, wherein determining at least one of the first or second control values comprises at least one of:
   variable scanning of the first or second trajectory; or
   correcting at least one point of the first or second trajectory to a control value when a deviation of a cartesian pose that corresponds to the point of the trajectory from a corresponding point of the path that has been corrected, exceeds a specified tolerance value.

5. The method of claim 4, wherein at least one of:
   the corrected path is a path that is corrected in a sensor-assisted manner; or
   correcting at least one point of the determined first or second trajectory is performed while at least one of:
   resolving a redundancy of the robot assembly with respect to the path, or
   resolving a redundancy of the robot assembly in order to reduce the deviation.

6. The method of claim 2, wherein determining the first or second trajectory comprises:
   planning the path based on at least one of the poses or of an operational program for the robot assembly;
   determining discrete trajectory points on the basis of discrete path points;
   optimizing a velocity profile of the trajectory on the basis of a dynamic model of the robot assembly;
   interpolating discrete trajectory points; or resolving a redundancy of the robot assembly with respect to the path.

7. The method of claim 6, wherein at least one of:
planning the path comprises optimizing the path;
determining the discrete trajectory points comprises performing inverse transformations based on the discrete path points; or
determining the discrete trajectory points is performed while recursively minimizing a deviation of a cartesian pose that corresponds to the relevant trajectory point from a corresponding point of the path.

8. The method of claim 6, wherein resolving the redundancy comprises taking account of a quality factor that is specified in at least one of cartesian or axis space.

9. The method of claim 8, wherein at least one of:
the quality factor comprises at least one of a distance from axis regions to be avoided or desired cartesian poses; or
the quality factor is specified by a null space projection.

10. The method of claim 1, wherein at least one of:
the robot assembly comprises at least two robot arms; or
the at least one robot arm comprises at least seven axes.

11. Control means for controlling a robot assembly that includes at least one robot arm, the control means configured to:
determine a path of at least one reference fixed to the robot assembly from a plurality of Cartesian poses that are specified in advance;
prior to each traveling of the complete path, determine a first trajectory that accounts for position and orientation in an axis space of the robot assembly based on the path;
determine first control values in the axis space based on the first trajectory; and
control operation of the robot assembly based on the first control values.

12. A robot assembly, comprising at least one robot arm and a control means according to claim 11.

13. A computer program product for controlling a robot assembly that includes at least one robot arm, the computer program product comprising program code stored on a non-transitory, computer-readable medium, the program code, when executed by a computer, causing the computer to:
determine a path of at least one reference fixed to the robot assembly from a plurality of Cartesian poses that are specified in advance;
prior to each traveling of the complete path, determine a first trajectory that accounts for position and orientation in an axis space of the robot assembly based on the path;
determine first control values in the axis space based on the determined first trajectory; and
control operation of the robot assembly based on the determined first control values.

* * * * *